J. E. LEAVITT.
TRACTOR.
APPLICATION FILED OCT. 4, 1915.

1,386,064.

Patented Aug. 2, 1921.
4 SHEETS—SHEET 2.

Inventor:
John E. Leavitt,
by Attys.

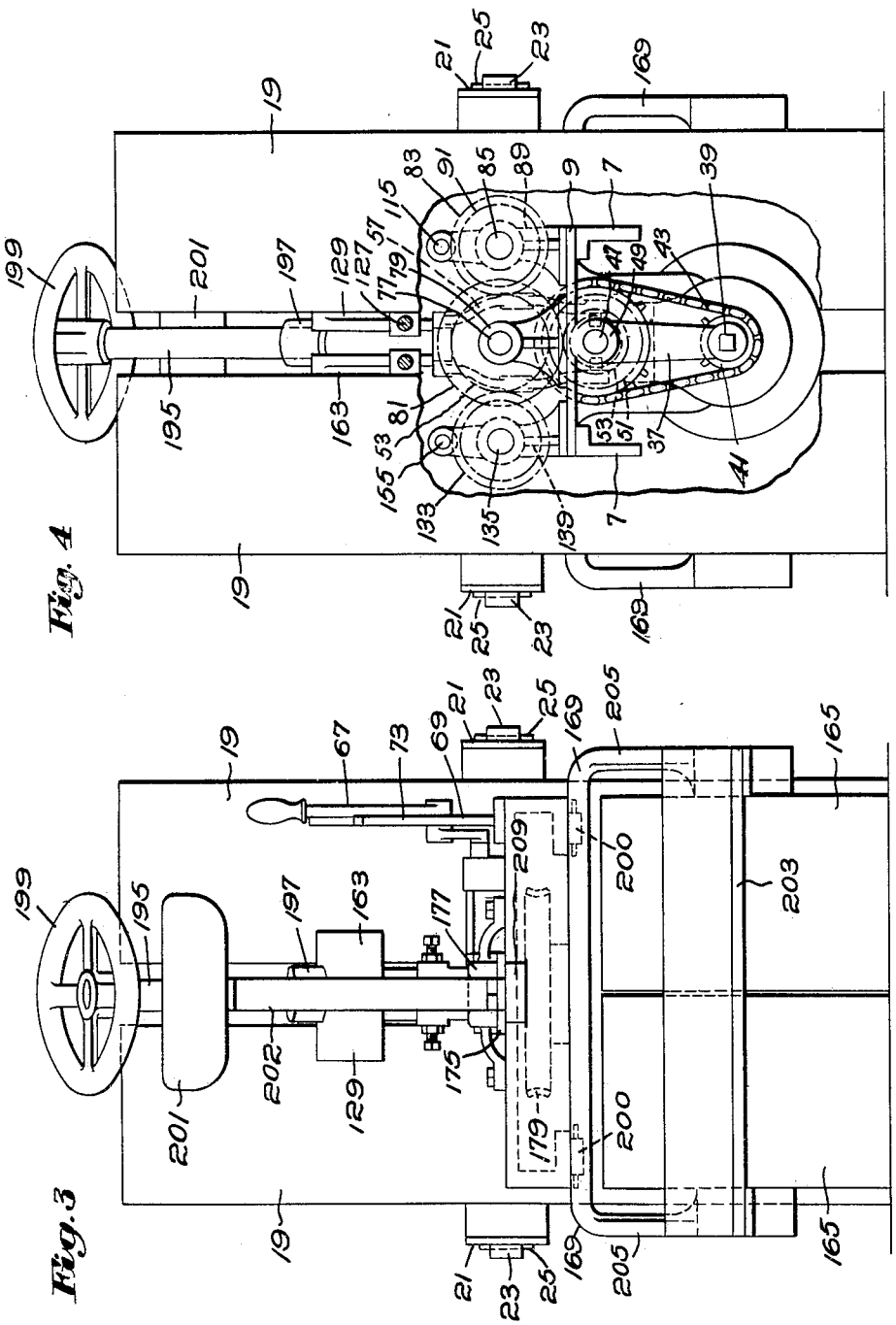

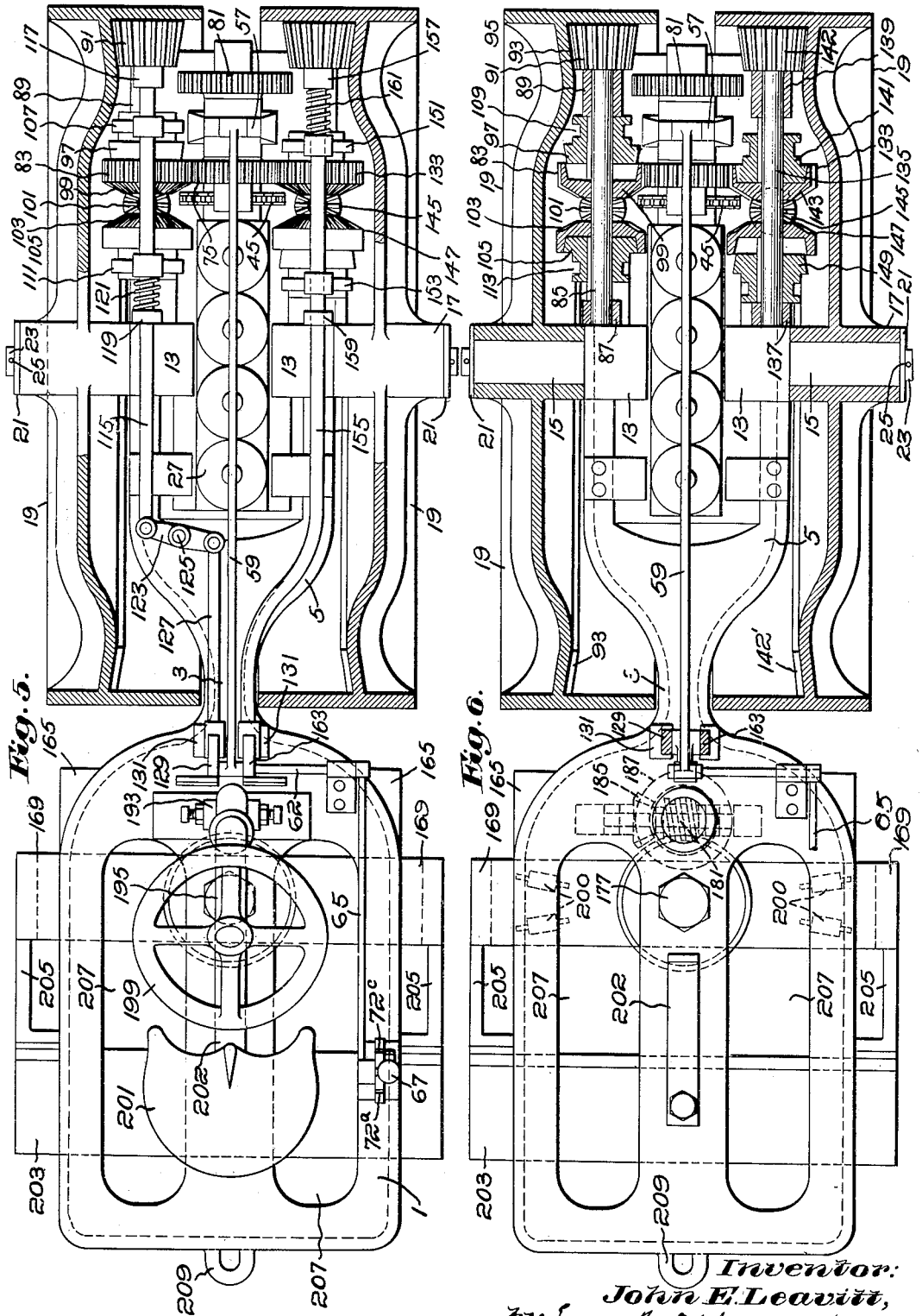

UNITED STATES PATENT OFFICE.

JOHN E. LEAVITT, OF BOSTON, MASSACHUSETTS.

TRACTOR.

1,386,064.   Specification of Letters Patent.   Patented Aug. 2, 1921.

Application filed October 4, 1915. Serial No. 53,887.

*To all whom it may concern:*

Be it known that I, JOHN E. LEAVITT, a citizen of the United States, and a resident of Boston, in the county of Suffolk and Commonwealth of Massachusetts, have invented an Improvement in Tractors, of which the following description, in connection with the accompanying drawings, is a specification, like characters on the drawings representing like parts.

This invention relates to tractors, and among other objects aims to provide a tractor for agricultural purposes having a narrow tread, a low center of gravity, and capable of turning in a minimum radius.

The character of the invention may be best understood by reference to the following description of an illustrative embodiment thereof shown in the accompanying drawings, wherein:—

Fig. 3 is a rear elevation of the tractor;

Fig. 4 is a front elevation of the tractor with parts of the driving wheels broken away to disclose mechanism contained therein;

Fig. 5 is a view partially in plan and partially in horizontal section of the tractor;

Fig. 6 is a horizontal section showing parts appearing in Fig. 5 but in different position.

Figure 1:
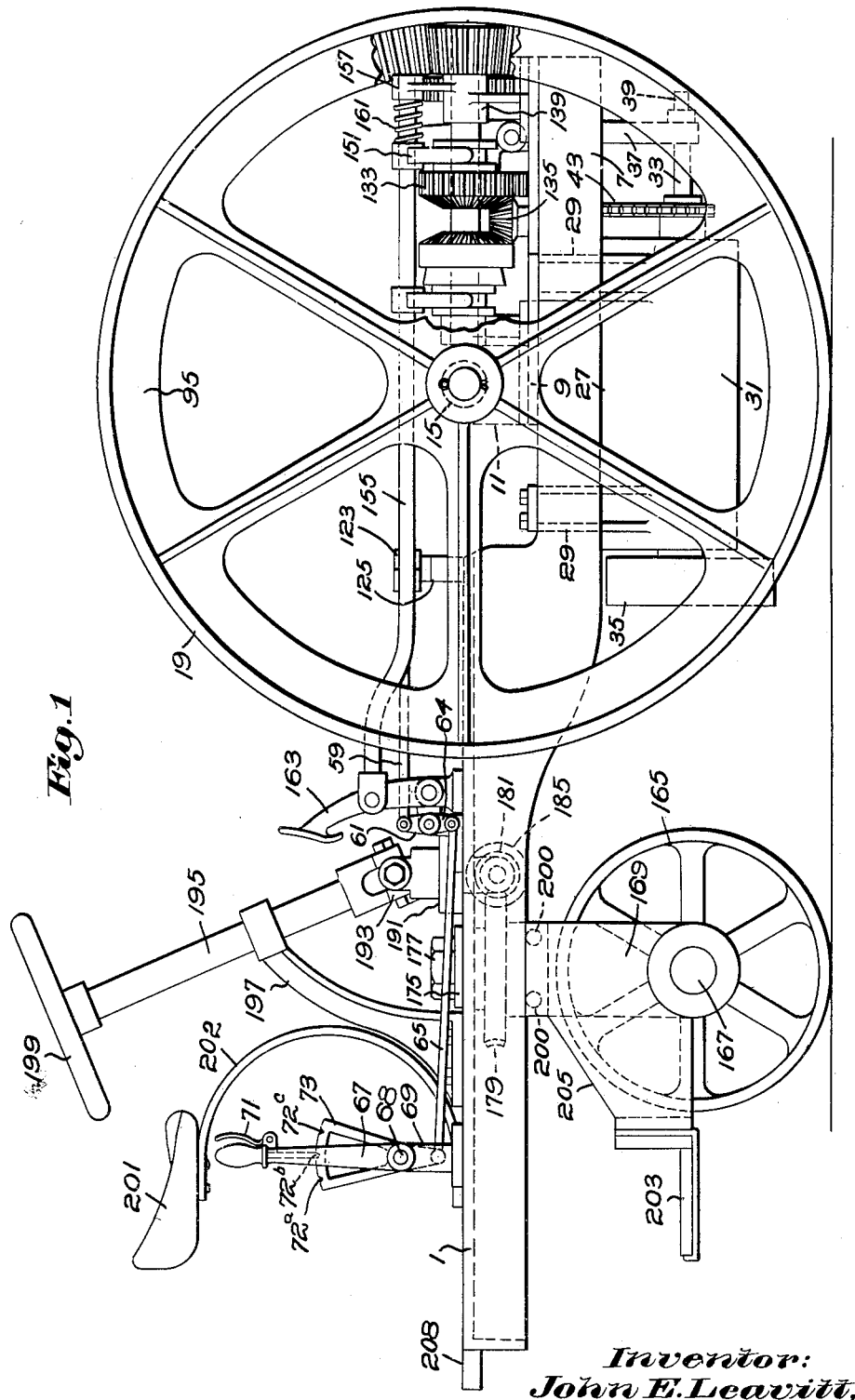
Figure 1 is a side elevation of an illustrative tractor shown herein as embodying the invention with a portion of one of the wheels broken away to disclose mechanism contained therein.
Figure 2:
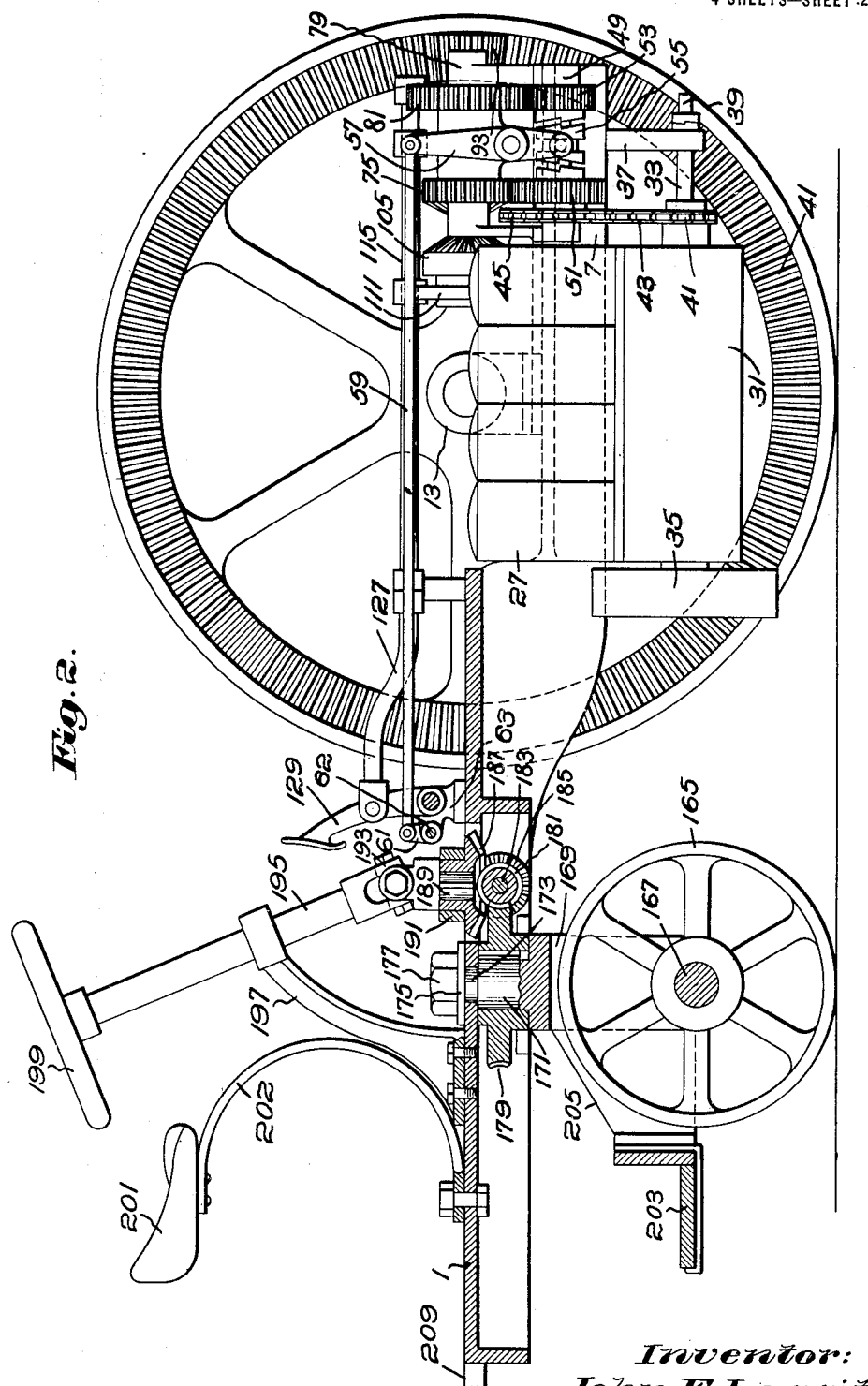
Fig. 2 is a vertical, longitudinal section through the tractor shown in Fig. 1.

Referring to the drawing, the illustrative tractor shown therein as embodying the invention comprises a frame of steel or other suitable material formed to present a platform 1 (Fig. 5) connected by a narrow neck 3 with a fork 5 presenting arms 7 preferably dropped somewhat from the plane of the platform as shown in Fig. 1.

A bed plate 9 mounted on said fork members 7 supports blocks 11 having bosses 13 (Figs. 5 and 6) receiving stud shafts 15 projecting outward therefrom. On these shafts are journaled the hubs 17 of large, wide tread driving wheels 19 spaced a short distance apart to allow the frame neck 3 to pass between them. Washers 21 and pins 25 serve to hold the wheel hubs on said shafts. The tread of the wheels is sufficiently wide to prevent them from sinking into soft ground, while the total width of the wheels is sufficiently narrow to enable the tractor to travel between rows of plants and in other narrow paths.

To drive the tractor, a suitable motor may be provided typified herein as a four-cylinder gasolene engine 27 (Figs. 1, 2, 5 and 6) conveniently located between the large wheels 19 and having a portion thereof projecting downward through the bed plate 9 between the fork arms 7 referred to, where it is supported by hangers 29 (Fig. 1) projecting upward between said arms and having ends thereof bent over upon and bolted to said arms. The main portion of the engine is located a substantial distance beneath the axis of the wheels, thereby desirably contributing to the lowering of the center of gravity of the tractor and the preventing of the tipping over thereof as more fully hereinafter described.

The engine is provided with a casing 31 (Figs. 1 and 2) in which is journaled a crank shaft 33 having a fly-wheel 35 at one end thereof. The opposite end of said shaft projects beyond the casing and is journaled in a bracket 37 depending from and secured to the plate 9 referred to. The shaft has a squared end 39 projecting forwardly between the driving wheels where it is conveniently accessible for receiving the usual crank for starting the engine.

A sprocket wheel 41 fast on the crank shaft is connected by a sprocket chain 43 with a sprocket wheel 45 fast on a speed change shaft 47 (Fig. 4) journaled in bearings in brackets 49 depending from the plate 9.

A gear 51 and a pinion 53 (Fig. 2) loose on said shaft are provided with hubs having clutch faces coöperating with similar clutch faces of a spool 55 splined to said shaft. To shift this spool axially of said shaft to connect either the gear 51 or pinion 53 therewith, there is provided a lever 57 having its lower end connected to said spool and its upper end connected to a rod 59 (Figs. 1, 2, 5 and 6) which extends rearward between the wheels 19 and is connected to an arm 61 (Fig. 2) fast on a transverse shaft 62 journaled in bearings in brackets 63 mounted on the platform 1. An arm 64 (Fig. 1) fast on said shaft 62 is connected by a link 65 with a hand lever 67 on a stud shaft 68 projecting from a bracket 69 mounted on said platform. The handle is provided with a spring-pressed latch controlled by a hand grip 71 and adapted to engage any of three notches, 72ª, 72ᵇ, 72ᶜ, in a segment 73 projecting up from said bracket.

When the latch is in the intermediate notch 72ᵇ, the spool 55 will be out of engagement with both the gear 51 and the pinion 53. When the handle is shifted so the latch engages the rear end notch 72ª, the spool will be shifted forward to connect the pinion 53 with the speed change shaft 47. When the handle is shifted forward so that the latch engages the forward end notch 72ᶜ, the spool will be shifted rearward to connect the gear 51 with said speed change shaft.

The gear 51 is adapted to mesh with a gear 75 (Figs. 2, 5 and 6), preferably of the same diameter as the gear 51 fast on a transmission shaft 77 (Fig. 4) journaled in bearings 79 mounted on the plate 9. The pinion 53 meshes with a gear 81 (Figs. 2 and 5) substantially larger than said pinion and also fast on the transmission shaft 77. Therefore, when the gear 51 is connected to the speed change shaft, one speed will be imparted to the transmission shaft, and when the pinion 53 is connected to the speed change shaft, a reduced speed will be imparted to said transmission shaft.

The large wheels 19 may be independently driven from the gears 75 and 81. To accomplish this there may be provided a gear 83 (Figs. 4, 5 and 6) loose on a counter shaft 85 journaled in bearings in brackets 87 and 89 mounted on the plate 9. A bevel pinion 91 fast on the forward end of said counter shaft meshes with an internal gear 93 formed on a circumferential flange 95 of one of the driving wheels.

To connect the gear 83 to the shaft 85, a face of said gear is formed to present a conical recess adapted to receive a conical wheel 97 splined to said shaft and slidable into and out of frictional engagement with the gear 83. When clutched thereto the driving wheel will rotate in one direction. To rotate said wheel in an opposite direction the gear 83 is formed to present a bevel gear 99 adapted to mesh with a bevel pinion 101 (Figs. 1, 5 and 6) fast on the upper end of a stud shaft journaled in a bearing in a bracket mounted on the plate 9 referred to. This pinion meshes with a bevel gear 103 loose on the counter shaft 85 and adapted to be connected to said shaft by a conical wheel 105 splined to said shaft and adapted to be moved into frictional engagement with a conical recess in a face of said bevel gear 103. Thus the bevel gear 103 is driven by the bevel gear 99 through the pinion 101, but in an opposite direction to said gear 99.

The cone friction wheels 97 and 105 may be shifted axially of said counter shaft into and out of engagement with the bevel gears 99 and 103 to connect one or the other of said gears to said shaft according to the direction of rotation desired to be imparted to the wheel 19. To accomplish this a fork 107 coöperating with a groove 109 in the hub of the wheel 97 and a fork 111 coöperating with a groove 113 in the hub of the wheel 105, are secured to and depend from a rod 115 (Fig. 5) adapted to slide in a bearing 117 mounted on the bearing bracket 89 referred to, and in a bearing 119 mounted on the bearing bracket 87 referred to. This rod is normally urged forwardly by a helical spring 121 (Fig. 9) encircling the rod 115 and confined between the fork 111 and the bearing 119. As a result, normally the wheel 105 is urged into frictional engagement with the gear 103 to connect the same with the counter shaft and the wheel 97 is held out of engagement with the gear 83 to disconnect the latter from the counter shaft, and the wheel 19 will be driven to advance the tractor forwardly.

When it is desired to drive the tractor backwardly the wheel 105 is disconnected from the gear 103 and the wheel 97 is connected to the gear 99. To shift the rod 115 rearwardly for this purpose, the rear end thereof may be connected to one end of a lever 123 (Fig. 5) fulcrumed intermediate its ends on a pin 125 on the fork 5 referred to, the other end of said lever being connected to a rod 127 which extends rearward between the wheels 19 and is connected with a foot lever 129 fulcrumed on a shaft 130 mounted in a bracket 131 on the frame of the platform 1 at a point conveniently accessible to the driver.

The other wheel 19 (Figs. 5 and 6) may also be driven through the gears 75 and 81 referred to. To accomplish this there may be provided a gear 133 loose on a counter shaft 135 journaled in bearings in a bracket 137 and a bracket 139 mounted on the plate 9. To connect the gear 133 with said shaft, a conical wheel 141 is mounted on and splined to said shaft and adapted for engagement with a conical recess in the gear 133. When the gear 133 is connected to the counter shaft the wheel 19 will be driven to advance the tractor. The shaft 135 has a bevel pinion 142 fast therein adapted to drive an internal gear 142′ on the wheel 19.

To reverse the tractor the gear 133 is formed to present a bevel gear 143 meshing with a pinion 145 fast on the upper end of a stud shaft journaled in a bearing in a bracket mounted on the plate 9. This pinion meshes with a bevel gear 147 loosely mounted on the shaft 135 and adapted to be connected therewith by a conical wheel 149 splined to the shaft 135 and adapted for frictional engagement with a conical recess in the gear 147.

To slide the wheels 141 and 149 into and out of engagement with their respective gears, there may be provided forks 151 and 153 (Fig. 5) coöperating with grooves in the hubs of said wheels and mounted fast on a rod 155 (Fig. 5) adapted to slide axially in a bearing 157 on the bearing bracket 139 referred to and in a bearing 159 mounted on the bearing bracket 137 referred to.

The rod is normally urged rearward by a helical spring 161 confined between the bearing 157 and the fork 151. As a result, normally the wheel 141 is held in frictional engagement with the gear 133 and the wheel 149 is held out of engagement with the gear 147 as shown in Fig. 6 to advance the tractor.

When it is desired to reverse the tractor, the rod 155 should be shifted forwardly against the resistance of the spring 161 to connect the wheel 149 with the gear 147 and disconnect the wheel 141 from the gear 133. To accomplish this, the rod is extended rearwardly between the wheels 19 and is connected to a foot lever 163 pivotally mounted on the shaft in the bracket 131 referred to and at the side of the foot lever 129 where conveniently accessible to the driver.

The helical springs 121 and 161 will normally hold the conical frictional clutches in position to connect the appropriate gears to the counter shafts to simultaneously rotate the driving wheels to advance the tractor.

To reverse the tractor it is merely necessary to simultaneously press both of the foot levers, thereby shifting the conical clutches to connect the appropriate gears to the counter shafts to reverse the driving wheels.

To make sharp turns one or the other of the foot levers is pressed, according to the direction desired, thereby causing one of the driving wheels to rotate in one direction and the other in the opposite direction.

To contribute to the support of the frame platform 1, there may be provided a pilot wheel 165 beneath the same (Figs. 1 and 2) mounted on a shaft 167 journaled in bearings in a U-shaped carrier 169. On the top of this carrier is a stud shaft 171 having a reduced end 173 journaled in a bearing formed in the platform and projecting above said platform to receive a washer 175 and a nut 177 for holding said stud shaft in position.

To turn the pilot wheel to steer the tractor, the stud shaft 171 is provided with a worm wheel 179 fast thereon, conveniently directly beneath the platform 1. Meshing with said worm wheel is a worm 181 fast on a shaft 183 journaled in bearings in brackets mounted on the under face of said platform. Also on said shaft 183 is a bevel pinion 185 (Fig. 6) meshing with a bevel gear 187 fast on the lower end of a stud shaft 189 projecting upward through a bearing in a boss 191 mounted on said platform. This stud shaft is connected by a universal joint 193 with a steering shaft 195 journaled in a bearing on the upper end of a curved arm 197 mounted on said platform. The shaft 195 has a hand wheel 199 fast thereon whereby the shaft may be readily turned and operate through the gears described for turning the pilot wheel carrier to steer the tractor as desired. The worm and worm wheel will act desirably to prevent the turning of the carrier excepting by the steering wheel. To contribute to the positioning of the pilot wheel carrier and to facilitate the turning thereof, rollers 200 (Figs. 3 and 6) may be mounted in recesses on the upper face of the carrier and roll along tracks mounted on the under face of the platform.

The usual devices may be mounted on the steering wheel and shaft for controlling the starting, stopping and speed of the engine.

A seat 201 (Figs. 1 and 2) may be mounted on the upper end of a curved support 202 secured to said platform. The steering wheel, the foot levers 129 and 163, and the lever 67 for controlling the speed change gears are all arranged where they are within easy reach and conveniently accessible to the driver when occupying said seat.

It is very important that the tractor should have a low center of gravity to prevent any possibility of its tipping over when traveling along sloping surfaces. The low position of the engine has already been referred to as contributing to the lowering of the center of gravity of the tractor. The transmission mechanism from the engine to the driving wheels 19 also is located well down toward the ground and further contributes to the lowering of the center of gravity.

The low disposition of the parts as described probably would be sufficient under ordinary conditions to prevent any possibility of the tipping over of the tractor. As a further precaution against tipping over on extreme slopes, there may be provided a wide step 203 (Figs. 1 and 3) supported by hangers 205 projecting rearward from and secured to the pilot wheel carrier. To permit the driver to step readily from his seat to said step, the platform may be provided with elongated apertures 207 (Figs. 5 and 6). Thus he may quickly transfer his weight from the seat 201 to the step 203. As his body always naturally remains substantially vertical, the point of application of his weight will be at the step closely adjacent to the ground where it will be a pronounced factor contributing to the prevention of the tipping over of the tractor.

The rear end of the platform 1 may be provided with an ear 208 (Figs. 5 and 6) projecting therefrom having an eye for connection with agricultural implements or other devices.

The engine, the transmission mechanism, and the principal parts of the controlling mechanism therefor, are all located within the radius of the large driving wheels, thereby bringing the weight thereof directly on the driving wheels where it may contribute desirably to the traction effect. Said wheels also serve as a shield or housing for protecting said parts.

The transmission mechanism including the pinions engaging the internal gears at the peripheries of the large driving wheels enables the rotation of the latter with desirable mechanical advantage, thereby reducing the power and fuel necessary for the engine.

It will be observed the pilot wheel is closely adjacent to the large driving wheels and is directly beneath the vertical axis of its carrier as distinguished from a caster wheel which would be offset from the axis of its carrier. These features facilitate the turning of the tractor. When the driving wheels are rotated in opposite directions the tractor turns on a vertical axis passing through the horizontal axis of the driving wheels midway between them. If a caster wheel were used it would offer considerable drag and opposition to the turning of the tractor before said caster wheel would swing on the vertical axis of its carrier to follow the turning movement of the tractor. By the use of the pilot wheel described this opposition may be eliminated because said wheel may be preliminarily directed by the hand wheel appropriately to follow the swinging of the frame about said vertical axis and always remains close to and the same distance from said axis.

The ability of the tractor to make partial or complete sharp turns in a minimum radius enables it to travel into restricted places and cover areas which otherwise would be inaccessible if the tractor were unable to make the sharp turns as described.

The tractor is light, strong, simple, compact, cheap to manufacture, easy to operate, and without likelihood of getting out of order.

The tractor described is very useful for agricultural purposes. The rear end of its platform may be constructed and arranged to permit a great variety of agricultural implements to be detachably connected thereto.

Having described one illustrative embodiment of the invention without limiting the same thereto, what I claim as new and desire to secure by Letters Patent is:—

1. A tractor comprising in combination, a pair of driving wheels closely arranged collectively to furnish a narrow tread, a pilot wheel, a frame connecting said driving wheels with said pilot wheel, a motor and transmission means supported by said frame within the circumferences of and pricipally beneath the axes of said driving wheels to lower the center of gravity of the tractor, a seat mounted on said frame, and a step adjacent the ground beneath said frame to receive the weight of the driver to contribute to the lowering of the center of gravity of the tractor.

2. A tractor comprising in combination, a pair of driving wheels closely arranged to collectively provide a narrow tread, a pilot wheel, a frame connecting said wheels having a platform over said pilot wheel, a driver's seat mounted on said platform, and a step adjacent the ground beneath said platform, said platform being apertured to permit the driver to transfer his weight from said seat to said step to contribute to the lowering of the center of gravity of the tractor.

3. A tractor comprising in combination, a pair of driving wheels 19 closely arranged collectively to provide a narrow tread, a wheel 165, a frame 1 supported on said wheels having a portion 3 projecting between said driving wheels, means for rotating said driving wheels including gears 93 and 142' on the latter, pinions 91 and 142 meshing with said gears respectively, shafts 85 and 135 for said pinions projecting inward toward the axes of said driving wheels, gears 99 and 103 loose on the shaft 85, an intermediate gear 101 meshing therewith, gears 143 and 147 on said shaft 135, an intermediate gear 145 meshing therewith, means including a motor for rotating said intermediate gears, clutch means alternatively to connect the gears 143 and 147 with the shaft 135, clutch means alternatively to connect gears 99 and 103 with the shaft and controlling members 129 and 163 for said clutches located externally of said driving wheels.

4. A tractor comprising a frame having a pair of wheels independently journaled thereon, said wheels being set closely together and having broad treads overhanging said frame, a motor carried by said frame between said wheels, the motor also being overhung by the wheel treads, transmission means for driving the wheels from said motor, an extension of said frame providing a platform adjacent the wheels, a supporting wheel for the platform and control means accessible from the platform including means for guiding said last wheel.

5. A tractor comprising a frame having a pair of wheels independently journaled thereon, said wheels being set closely together and having broad treads overhanging said frame, a motor carried by said frame and suspended by the same between said wheels and beneath the axes thereof, the motor also being overhung by the wheel treads, transmission means for driving the wheels from said motor, an extension of said frame providing a platform adjacent the wheels, a supporting wheel for the platform and control means accessible from the platform including means for guiding said last wheel.

6. A tractor comprising a frame having a pair of wheels independently journaled thereon, said wheels being set closely together and having broad treads overhanging said frame, a motor carried by said frame between said wheels, the motor also being overhung by the wheel treads, transmission means for driving the wheels from said motor, an extension of said frame providing a platform adjacent the wheels, a vertical post beneath the platform, a wheel journaled thereto and control means accessible from the platform including means for turning the post.

7. A tractor comprising a frame having wheels journaled thereon, said wheels set close together and having treads overhanging the frame, a motor on the frame overhung by said tread and supported thereby with its center of gravity below the wheel axes, transmission means from motor to wheels, an extension of said frame on one end only projecting between the wheel treads and providing a control platform for the tractor of a width within the gage of said wheels and supporting means for the platform providing a third point of support for the motor.

In testimony whereof, I have signed my name to this specification, in the presence of two subscribing witnesses.

JOHN E. LEAVITT.

Witnesses:
HENRY T. WILLIAMS,
LOUIS A. JONES.